(12) United States Patent
Chin et al.

(10) Patent No.: US 7,381,942 B2
(45) Date of Patent: Jun. 3, 2008

(54) TWO-DIMENSIONAL OPTICAL ENCODER WITH MULTIPLE CODE WHEELS

(75) Inventors: Chen Khol Chin, Selangor (MY); Chung Min Thor, Perak (MY)

(73) Assignee: Avago Technologies ECBU IP Pte Ltd, Singapore (AG)

(*) Notice: Subject to any disclaimer, the term of this patent is extended or adjusted under 35 U.S.C. 154(b) by 11 days.

(21) Appl. No.: 11/339,952

(22) Filed: Jan. 25, 2006

(65) Prior Publication Data
US 2007/0170355 A1 Jul. 26, 2007

(51) Int. Cl.
*G01D 5/34* (2006.01)
(52) U.S. Cl. .............. 250/231.13; 250/208.2; 356/616
(58) Field of Classification Search .............. 250/231.13–231.18, 221, 222.1, 208.2; 341/11, 341/13, 31; 33/1 N, 1 PT; 345/161, 165, 345/166, 163, 167; 356/614–617, 622
See application file for complete search history.

(56) References Cited

U.S. PATENT DOCUMENTS

| | | | | |
|---|---|---|---|---|
| 4,543,571 A | * | 9/1985 | Bilbrey et al. | 345/166 |
| 4,880,967 A | * | 11/1989 | Kwang-Chien | 250/221 |
| 5,717,610 A | * | 2/1998 | Baba | 702/150 |
| 5,981,941 A | * | 11/1999 | Takata et al. | 250/231.16 |
| 6,097,372 A | * | 8/2000 | Suzuki | 345/167 |
| 6,191,775 B1 | * | 2/2001 | Suzuki | 345/167 |
| 6,486,802 B2 | * | 11/2002 | Watanabe | 341/13 |
| 6,630,659 B1 | | 10/2003 | Stridsberg | |
| 6,653,619 B2 | | 11/2003 | Chin | |
| 6,707,029 B1 | * | 3/2004 | Fuwa | 250/237 G |
| 6,756,581 B2 | * | 6/2004 | Ohtomo et al. | 250/231.13 |
| 6,768,101 B1 | | 7/2004 | Lee | |
| 6,847,031 B2 | * | 1/2005 | Shiga | 250/231.13 |
| 7,145,131 B2 | * | 12/2006 | Mizuno et al. | 250/231.18 |
| 2002/0180701 A1 | * | 12/2002 | Hayama et al. | 345/163 |
| 2004/0135077 A1 | * | 7/2004 | Hane | 250/231.13 |
| 2005/0098715 A1 | * | 5/2005 | Kataoka | 250/231.13 |

OTHER PUBLICATIONS

Agilent AEDR-8300 Series Encoders Reflective Surface Mount Optical Encoder Data Sheet (10 pgs).
Agilent AEDR-8300 Series Motion Sensing Products Optical Encoder Modules Reliability Data Sheet (4 pgs).

* cited by examiner

*Primary Examiner*—Georgia Epps
*Assistant Examiner*—Stephen Yam

(57) ABSTRACT

An exemplary Two-Dimensional Optical encoder ("2-D Encoder") described herein includes a light emitter and a light detector array. The light detector array includes at least one band of light detectors arranged on at least one diagonal of an X-Y grid having an X-axis and a Y-axis, wherein the X-axis and Y-axis are approximately orthogonal.

14 Claims, 7 Drawing Sheets

TWO-DIMENSIONAL OPTICAL ENCODER WITH MULTIPLE CODE WHEELS

BACKGROUND OF THE INVENTION

Optical encoders are useful for recording a movement of an object, so that the same movement of the object, or of another similar object, can later be repeated in a controlled manner. As an example, manufacturing apparatus can be controlled to robotically repeat a series of motions. The motions can be part of a process for robotically working on a device being manufactured, such as an automobile. In order to enable such repetition, an initial mechanical movement of the manufacturing apparatus can be translated into a light signal and can then be encoded as an electronic signal by detection of the light signal. A code wheel mechanically coupled with a robotic arm of the manufacturing apparatus can rotate around an axis together with rotation of the robotic arm. The code wheel can have a ring of alternating light reflective and non-reflective bands arranged around the axis. A focused light source such as a light emitting diode ("LED") can be directed from a fixed position onto the ring. As the code wheel rotates on the axis, induced by movement of the robotic arm, light beam pulses are reflected from the light reflective bands, as light from the fixed LED successively strikes them. These reflected light beam pulses constitute a light signal encoding the rotary motion of the code wheel. The light signal can then be converted into an electrical signal. A photodetector can receive the reflected light beam pulses and encode the light signal. The electrical signal can be digitally recorded for later access and then utilized to implement controlled repetition of the movement of a robotic arm.

Although a variety of optical encoders have been developed, there is a continuing need for improved optical encoders offering greater efficiency and capability to record motions.

SUMMARY

The present invention provides a New Two-Dimensional Optical Encoder ("2-D Encoder"), including a light emitter and a light detector array. The light detector array includes at least one band of light detectors arranged on at least one diagonal of an X-Y grid having an X-axis and a Y-axis, wherein the X-axis and Y-axis are approximately orthogonal. A process for making a 2-D Encoder including steps of forming such a light emitter and a light detector array is also provided. A method of encoding two-dimensional motion is additionally provided.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of various implementations, reference is made to the accompanying drawings that form a part of this disclosure, and which show, by way of illustration, specific implementations in which the invention may be practiced. Other implementations may be utilized and structural changes may be made without departing from the scope of the present invention.

Figure 1:
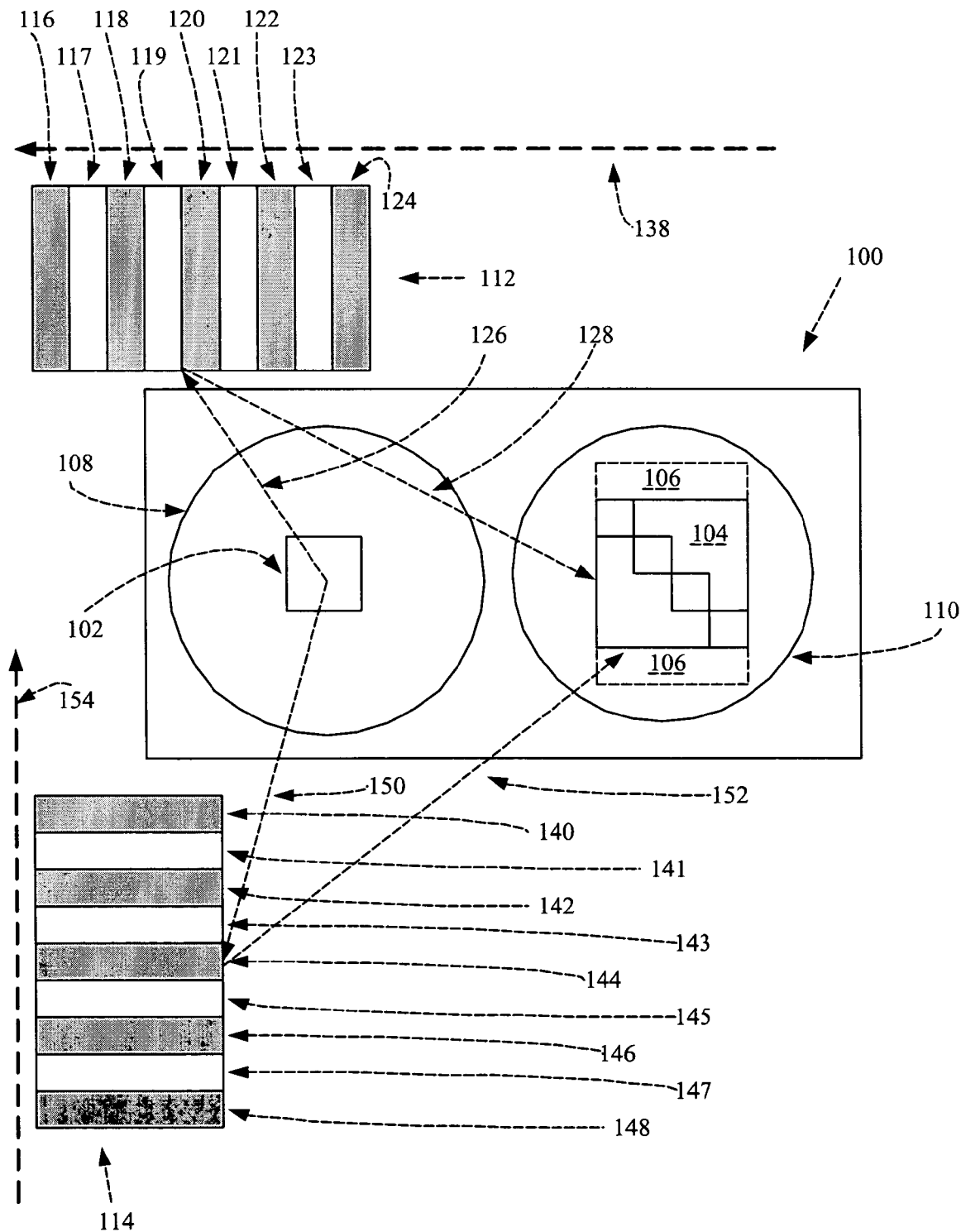
FIG. 1 shows a two-dimensional optical encoder including a light detector array.

In FIG. 1, an example of an implementation of a two-dimensional optical encoder "2-D Encoder" 100 is shown. The 2-D Encoder 100 may include an emitter 102, a light detector array 104, control circuitry 106 for the light detector array, a lens 108 positioned over the emitter 102, and a lens 110 positioned over the light detector array 104. As an example, the control circuitry 106 may also control other components of the 2-D Encoder including the emitter 102.

As an example, the 2-D Encoder 100 may be positioned in relation to a representative portion of a first code wheel 112, and a representative portion of a second code wheel 114. As an example, the code wheel 112 may include a series of alternating bands of light-reflective and non-reflective material arranged in a planar ring on the code wheel. FIG. 1 shows an example of a portion of a code wheel 112 including light reflective bands 116, 118, 120, 122 and 124, and non-reflective bands 117, 119, 121 and 123. The code wheel 112 may rotate on a central axis perpendicular to the planar ring. The rotation may be induced by movement of an external device (not shown). The movement may be encoded by the 2-D Encoder 100. Light may be projected from the emitter 102 onto the code wheel 112 as indicated by the arrow 126, and may be reflected by the light reflective bands 116, 118, 120, 122 and 124 as an intermittent pattern of light beam pulses onto the light detector array 104 as indicated by the arrow 128.

As an example, the 2-D Encoder 100 may encode and thus record the two dimensional motion of a robotically controllable machine (not shown), so that the recorded motion may subsequently be used by a controller (not shown) for operating the machine.

Figure 2:
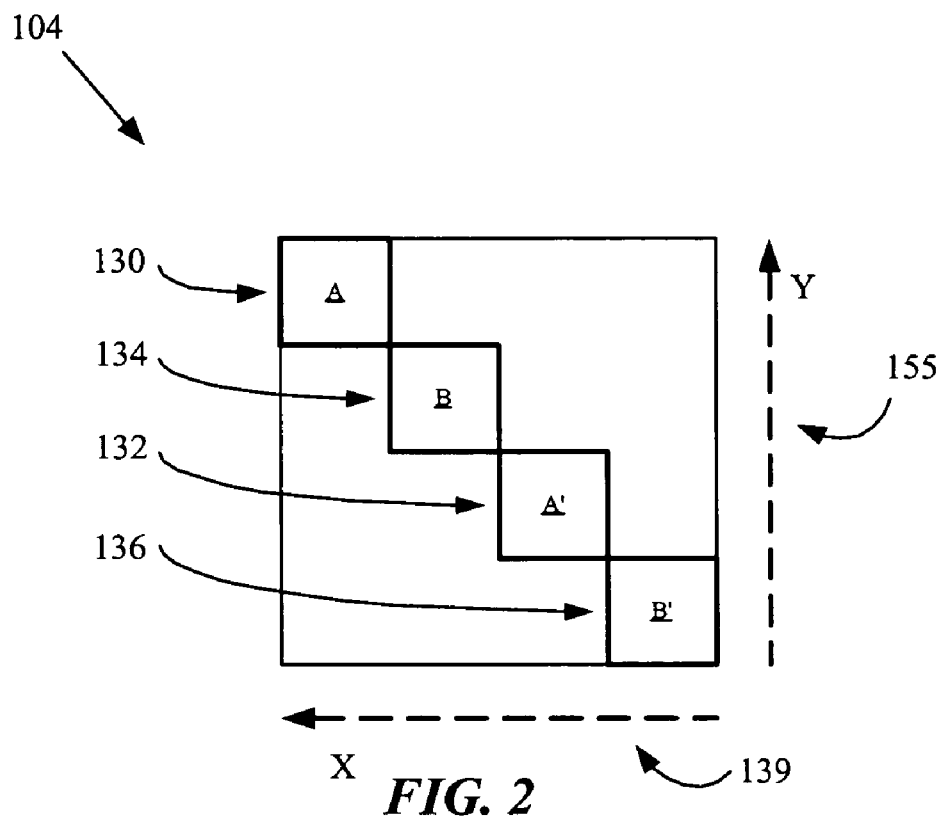
FIG. 2 shows details of a light detector array.

FIG. 2 shows the light detector array 104 in further detail. The light detector array 104 includes two light detectors A and A' indicated at 130 and 132 that together constitute light detector channel A. The light detector array 104 further includes two light detectors B and B' indicated at 134 and 136 that together constitute light detector channel B. As an example, each of the light detectors 130, 132, 134 and 136 may have uniform dimensions. By "uniform" is meant that the dimensions are approximately the same, although they may not be exactly the same. As an example, light beam pulses may be successively reflected from the light reflective bands 116, 118, 120, 122 and 124 onto light detector 130 in the light detector array 104 as the portion of the code wheel 112 shown in FIG. 1 rotates in the direction of the arrow 138. As an example, a light beam pulse reflected from the light reflective band 116 may be successively directed onto light detectors 136, 132, 134 and 130 in the direction of the arrow 139. Rising and falling edges of the light beam pulses may be detected by the light detectors 130-136, providing an indication of the movement of the portion of the code wheel 112 in the direction of the arrow 138. As examples, electrical outputs from the light detectors 130 and 132 may be added together, averaged, subtracted from each other, or processed through another statistical algorithm, to generate a channel A signal; and electrical outputs from the light detectors 134 and 136 may be added together, averaged, subtracted from each other, or processed through another statistical algorithm, to generate a channel B signal. The channel A and B signals may encode the motion of the portion of the code wheel 112 in the direction of the arrow 138.

In a similar manner, the code wheel 114 may include a series of alternating bands of light-reflective and non-reflective material arranged in a planar ring on the code wheel 114. FIG. 1 shows a portion of the code wheel 114 including light reflective bands 140, 142, 144, 146 and 148, and non-reflective bands 141, 143, 145 and 147. The code wheel 114 may rotate on a central axis perpendicular to the planar ring. The rotation may be induced by movement of an external device (not shown). The movement may be encoded by the 2-D Encoder 100. Light may be projected from the emitter 102 onto the code wheel 114 as indicated by the arrow 150, and may be reflected by the light reflective bands 140, 142, 144, 146 and 148 onto the light detector array 104 as indicated by the arrow 152. As an example, light beam pulses may be successively reflected from the light reflective bands 140, 142, 144, 146 and 148 onto light detector 130 in the light detector array 104 as the portion of the code wheel 114 shown in FIG. 1 rotates in the direction of the arrow 154.

In an example, the 2-D Encoder 100 may be positioned with respect to the code wheels 112 and 114 so that either one of channels A or B receives light beam pulses slightly earlier or later than the other channel. This phase differential may be used to detect directions of motion either consistent with or opposite to the directions indicated by the arrows 138 and 154.

The direction of the arrow 138 is approximately orthogonal to the direction of the arrow 154, indicating that the corresponding direction of motion of the portion of the code wheel 112 is also approximately orthogonal to the direction of motion of the portion of the code wheel 114, both as shown in FIG. 1. Accordingly, the code wheels 112 and 114 may be utilized to receive and encode orthogonal two-dimensional motion of an external object (not shown). As an example, the motion of the external object may be two-dimensional motion compatible with representation on a line graph having orthogonal X- and Y-axes. As shown in FIG. 2, the arrow 139 may represent the X-axis, and the arrow 155 may represent the Y-axis, forming an X-Y grid. A light beam pulse may as an example be reflected from the light reflective band 140 and successively directed onto light detectors 136, 132, 134 and 130 in the direction of the arrow 155. Rising and falling edges of the light beam pulses may be detected by the light detectors 130-136, providing an indication of the movement of the portion of the code wheel 114 in the direction of the arrow 154. The channel A and B signals encode the motion of the portion of the code wheel 114 in the direction of the arrow 154. Referring to FIG. 2, it can be seen that the arrow 139 and the arrow 155 are approximately orthogonal. Accordingly, the light detector array 104 may encode movement of the portion of the code wheel 112 in the direction 138, as well as movement of the portion of the code wheel 114 in the direction 154. Accordingly, the 2-D Encoder 100, which may have only one light detector array 104, may encode two-dimensional motion of an external object (not shown).

In an example, the light detectors A, A', B, and B' shown in FIG. 2 may be arranged in at least one band on at least one diagonal of an X-Y grid, in which the arrow 139 may represent the X-axis and the arrow 155 may represent the Y-axis. A beam of light traversing the light detector array 104 from a point along the arrow 155 in a direction parallel with the arrow 139, may intersect with no more than one of the light detectors 130, 134, 132 and 136 at a time; and may or may not at some points along the Y-axis during such a traversal, intersect with none of the light detectors. A beam of light traversing the light detector array 104 from a point along the arrow 139 in a direction parallel with the arrow 155 may likewise intersect with no more than one of the light detectors 130, 134, 132 and 136 at a time; and may or may not at some points along the X-axis during such a traversal, intersect with none of the light detectors. As an example, localized areas may exist along the X- and Y-axes of the light detector array 104 where such a beam of light moving in a similar manner in the direction of the Y- and X-axes respectively, may intersect with two or more of the light detectors 130-136 at a time.

Modifications may be made with regard to the code wheels 112 and 114. In an example, either or both of the code wheels 112 and 114 may be replaced by a code strip, or by another code source device having a series of alternating light reflective and non-reflective bands, the motions of which may be detected and recorded. As an example, code strips may be utilized to encode linear motion instead of rotary motion. The directions of the arrows 138 and 154, moreover, may be independently reversed, and then reversed again in multiple iterations of direction reversal. In another example, either or both of the code wheels 112 and 114 may have a series of alternating light transmissive and non-reflective bands, and the transmitted light may be directed onto the light detector array 104.

It is appreciated by those skilled in the art that further modifications may also be made in the 2-D Encoder 100. In an example, one or both of the lenses 108 and 110 may not be integral with the 2-D Encoder 100. As an example, the lenses 108 and 110 may form part of a structure maintaining the code wheels 112 and 114 in positions relative to the 2-D Encoder 100 that may be consistent with the arrows 126, 128, 150 and 152, focusing light reflected from the code wheels 112 and 114 onto the light detector array 104. In another example, the lenses 108 and 110 may include collimators to assist in maximizing the intensity and focus of light as directed onto the light detector array 104. In another example, the control circuitry 106 may not be integral with the 2-D Encoder 100 or may be located elsewhere within the 2-D Encoder 100. As an example, the control circuitry 106 may be replaced by lead lines (not shown) placing an externally located controller (not shown) in electronic communication with the light detector array 104. As another example, the control circuitry 106 may be arranged in two separate regions surrounding the detector array 104 as shown in FIG. 1 to conserve space in the 2-D Encoder 100. In another example, either or both of the code wheels 112 and 114 may be integral with the 2-D Encoder 100. As an example, the code wheels 112 and 114, the lenses 108 and 110, the emitter 102, the light detector array 104, and the control circuitry 106 may all form a unitary 2-D Encoder arranged so that the code wheels 112 and 114 may be interconnected with and driven by the two dimensional motion of an external object (not shown) which is to be encoded. In an alternative example, the 2-D Encoder 100 may include more than one light detector array 104.

Figure 3:
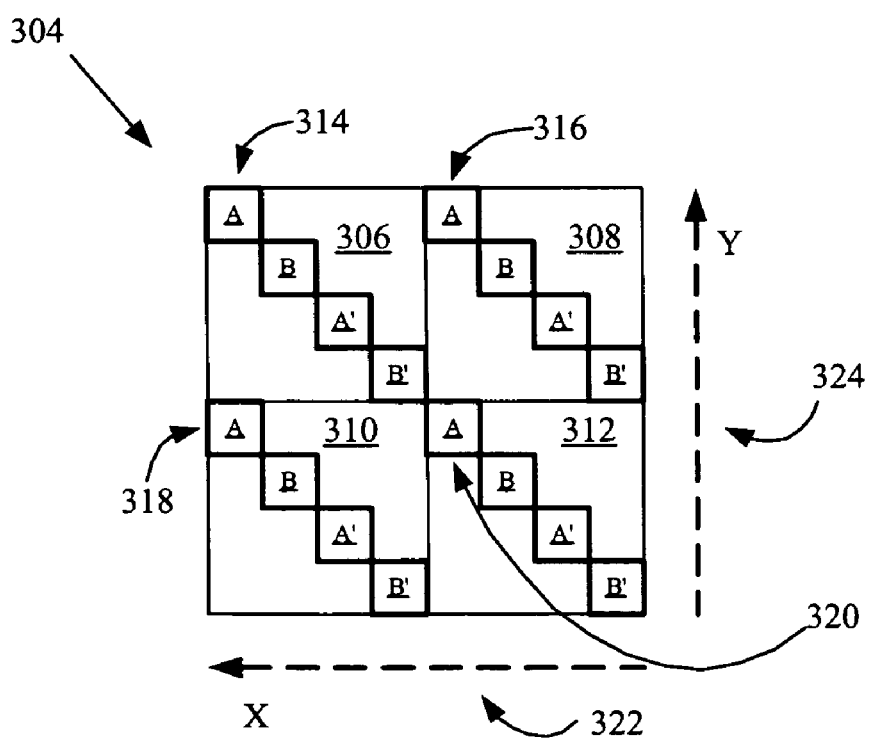
FIG. 3 shows details of another light detector array.

FIG. 3 shows another example of a light detector array 304 that may replace the light detector array 104. The light detector array 304 includes four sectors 306, 308, 310 and 312 each including light detectors A, A', B and B'. As an example, the light detector array 304 may include four light detectors A indicated at 314, 316, 318 and 320. Electronic output signals from the light detectors 314, 316, 318 and 320 may, as examples, be added together, averaged, subtracted, or processed through another statistical algorithm that converts such signals into a channel A output signal. Combination of multiple signals in such a manner may yield a more accurate, stable, light contrast sensitive, and/or stronger output signal. Such a light detector array 304 may also enhance the robustness of the 2-D Encoder 100 against code wheel defects such as fingerprints, dust, and other contamination. In a similar manner, the four channel A' signals may be analyzed; and the channel A and A' signals may be processed into an integrated channel A signal. Further, the channel B and B' signals may be processed in an analogous manner. As examples, the integrated channel A and B signals, or the channel A, A', B and B' signals, may be processed to analyze the encoded data as indicative of the two dimensional motion of an external object (not shown) that drives the movement of the code wheels 112 and 114. In an example, the light detector array 304 may have more than four sectors each including light detectors A, A', B and B'; or each of the sectors may include more than four detectors. As an example, the arrow 322 and the arrow 324 in FIG. 3 may be considered the X and Y axes, respectively, of an X-Y grid. As an example, the light detectors A, A', B, and B' shown in FIG. 3 may be arranged in a plurality of bands on at least one diagonal of the X-Y grid.

The emitter may generally be any source of light. As examples, the emitter may be a light emitting diode, a diode, a photo cathode, or a light bulb. In an example, light having wavelengths in the visible region may be utilized. In another example, light having shorter wavelengths, such as microwaves, or having longer wavelengths, may be utilized.

The light detector array may generally include any light detectors suitable to provide detection of the light reflected by the code wheels in the wavelengths utilized. As examples, the light detector array may include photodiodes, photo cathodes, photo detectors, and/or photomultipliers.

The control circuitry may be implemented as any suitable controller for the light detector array. As an example, the control circuitry may be an integrated circuit formed as a part of the light detector array in a unitary or distributed structure implemented on, as an example, a silicon chip.

Figure 4:
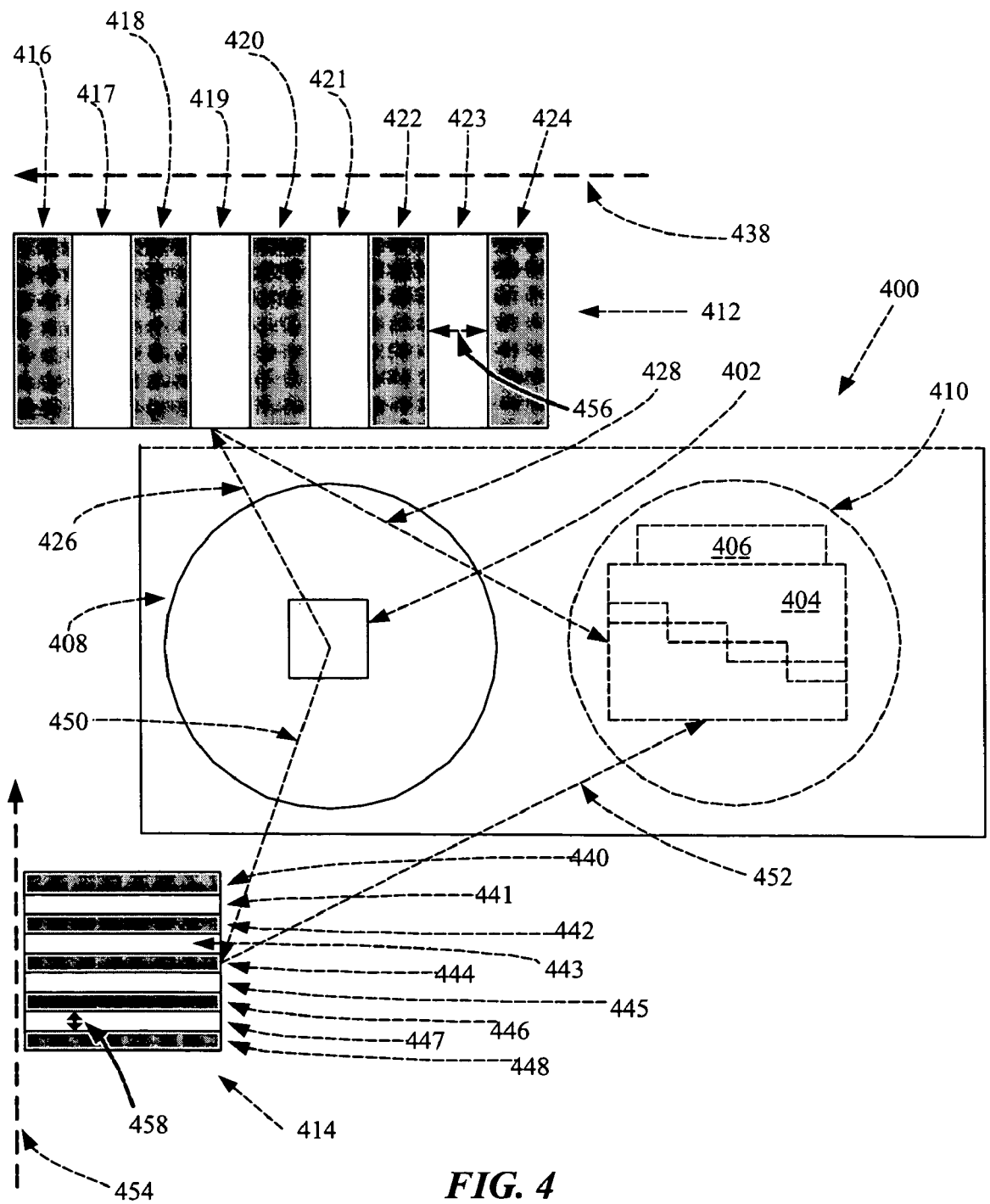
FIG. 4 shows another two-dimensional optical encoder including a light detector array.

In FIG. 4, an example of an implementation of a two-dimensional optical encoder "2-D Encoder" 400 is shown. The 2-D Encoder 400 includes an emitter 402, a light detector array 404, and control circuitry 406. In an example, the 2-D Encoder 400 further includes a lens 408 positioned over the emitter 402, and a lens 410 positioned over the light detector array 404.

As an example, the 2-D Encoder 400 may be positioned in relation to a representative portion of a first code wheel 412, and a representative portion of a second code wheel 414. In an example, light reflective bands in the second code wheel 414 may be spaced apart at a smaller distance and hence at a higher light resolution than are light reflective bands in the first code wheel 412, yet the light detector array 404 may still encode two dimensional motion based on light beam pulses received from both of the code wheels 412 and 414, as will be explained.

As an example, the code wheel 412 may include a series of alternating bands of light-reflective and non-reflective material arranged in a planar ring on the code wheel. As an example, a portion of the code wheel 412 may include light reflective bands 416, 418, 420, 422 and 424, and non-reflective bands 417, 419, 421 and 423. The code wheel 412 may rotate on a central axis perpendicular to the planar ring. The rotation may be induced by movement of an external device (not shown). The movement may be encoded by the 2-D Encoder 400. Light may be projected from the emitter 402 onto the code wheel 412 as indicated by the arrow 426, and may be reflected by the light reflective bands 416, 418, 420, 422 and 424 onto the light detector array 404 as indicated by the arrow 428.

Figure 5:
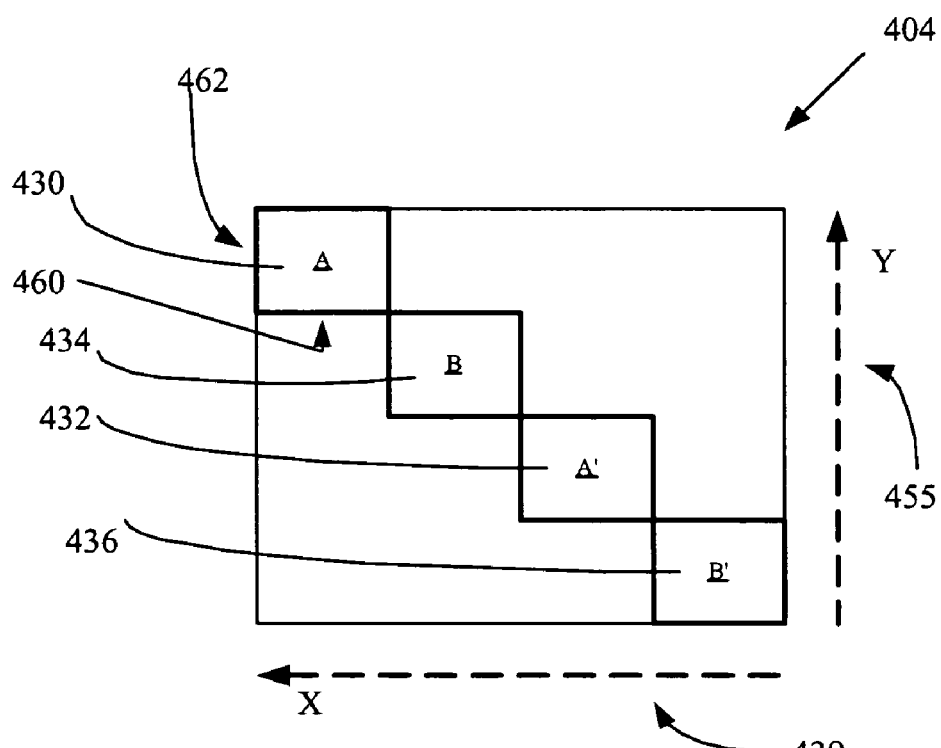
FIG. 5 shows details of an additional light detector array.

FIG. 5 shows the light detector array 404 in further detail. The light detector array 404 includes two light detectors A and A' indicated at 430 and 432 that together constitute light detector channel A. The light detector array 404 further includes two light detectors B and B' indicated at 434 and 436 that together constitute light detector channel B. As an example, each of the light detectors 430, 432, 434 and 436 may have uniform dimensions. In an example, light beam pulses may be successively reflected from the light reflective bands 416, 418, 420, 422 and 424 onto light detector 430 in the light detector array 404 as the portion of the code wheel 412 shown in FIG. 4 rotates in the direction of the arrow 438. As an example, a light beam pulse reflected from the light reflective band 416 may be successively directed onto light detectors 436, 432, 434 and 430 in the direction of the arrow 439. Rising and falling edges of the light beam pulses may be detected by the light detectors 430-436, providing an indication of the movement of the portion of the code wheel 412 in the direction of the arrow 438. As examples, electrical outputs from the light detectors 430 and 432 may be added together, averaged, subtracted from each other, or processed through another statistical algorithm, to generate a channel A signal; and electrical outputs from the light detectors 434 and 436 may be added together, averaged, subtracted from each other, or processed through another statistical algorithm, to generate a channel B signal. The channel A and B signals may encode the motion of the portion of the code wheel 412 in the direction of the arrow 438.

In a similar manner, the code wheel 414 may include a series of alternating bands of light-reflective and non-reflective material arranged in a planar ring on the code wheel 414. FIG. 4 shows a portion of the code wheel 414 including light reflective bands 440, 442, 444, 446 and 448, and non-reflective bands 441, 443, 445 and 447. The code wheel 414 may rotate on a central axis perpendicular to the planar ring. The rotation may be induced by movement of an external device (not shown). The movement may be encoded by the 2-D Encoder 400. Light may be projected from the emitter 402 onto the code wheel 414 as indicated by the arrow 450, and may be reflected by the light reflective bands 440, 442, 444, 446 and 448 onto the light detector array 404 as indicated by the arrow 452. In an example, light beam pulses may be successively reflected from the light reflective bands 440, 442, 444, 446 and 448 onto light detector 430 in the light detector array 404 as the portion of the code wheel 414 shown in FIG. 4 rotates in the direction of the arrow 454.

The direction of the arrow 438 is approximately orthogonal to the direction of the arrow 454, indicating that the corresponding direction of motion of the portion of the code wheel 412 shown in FIG. 4 is also approximately orthogonal to the direction of motion of the portion of the code wheel 414. Accordingly, the code wheels 412 and 414 may be utilized to receive and encode two-dimensional motion of an external object (not shown). Referring further to FIG. 4, a light beam pulse may as an example be reflected from the light reflective band 440 and successively directed onto light detectors 436, 432, 434 and 430 in the direction of the arrow 455. Rising and falling edges of the light beam pulses may be detected by the light detectors 430-436, providing an indication of the movement of the portion of the code wheel 414 in the direction of the arrow 454. The channel A and B signals may encode the motion of the portion of the code wheel 414 in the direction of the arrow 454.

Referring to FIG. 5, it can be seen that the arrow 439 and the arrow 455 are approximately orthogonal. Accordingly, the light detector array 404 may encode movement of the portion of the code wheel 412 in the direction 438, as well as movement of the portion of the code wheel 414 in the direction 454. Accordingly, the 2-D Encoder 400, which may have only one light detector array 404, may encode two-dimensional motion of an external object (not shown).

In an example, the light detectors A, A', B, and B' shown in FIG. 5 may be arranged in at least one band on at least one diagonal of an X-Y grid, in which the arrow 439 may represent the X-axis and the arrow 455 may represent the Y-axis. A beam of light traversing the light detector array 404 from a point along the arrow 455 in a direction parallel with the arrow 439, may intersect with no more than one of the light detectors 430, 434, 432 and 436 at a time; and may or may not at some points along the Y-axis during such a traversal intersect with none of the light detectors. A beam of light traversing the light detector array 404 from a point along the arrow 439 in a direction parallel with the arrow 455 may likewise intersect with no more than one of the light detectors 430, 434, 432 and 436 at a time; and may or may not at some points along the X-axis during such a traversal intersect with none of the light detectors. As an example, localized areas may exist along the X- and Y-axes of the light detector array 404 where such a beam of light moving in the direction of the Y- and X-axes respectively, may intersect with two or more of the light detectors 430-436 at a time.

Modifications may be made with regard to the code wheels 412 and 414 and in the 2-D Encoder 400 in manners analogous to those discussed above in connection with FIG. 1.

In an example, each of the light reflective and non-reflective bands 416-424 may have a same first thickness in the direction 438. In another example, each of the light reflective and non-reflective bands 440-448 may have a same second thickness in the direction 454. In another example, the second thickness may be different from the first thickness. Referring to the code wheel 412 as shown in FIG. 4, the light reflective bands 416, 418, 420, 422, and 424 may be spaced apart by the interposed non-reflective bands 417, 419, 421 and 423 at a distance represented by the arrow 456. This distance 456 also constitutes the width of each of the bands 416-424 on the code wheel 412. Referring to the code wheel 414, it can further be seen that the light reflective bands 440, 442, 444, 446 and 448 may be spaced apart by the interposed non-reflective bands 441, 443, 445 and 447 at a distance represented by the arrow 458. This distance 458 also constitutes the width of each of the bands 440-448 on the code wheel 414. As an example, the distance represented by the arrow 458 may be smaller than is the distance represented by the arrow 456. The distances 456 and 458 are indicative of the relative resolutions of the code wheels 412 and 414. The smaller the distance between adjacent light reflective bands, the higher the resolution of the code wheel. Higher resolution in a code wheel provides more data for encoding and hence higher encoding precision. Referring now to FIG. 5, it can be seen that the length of the side 460 of the light detector 430 in the direction of the arrow 439 may be greater than the length of the side 462 of the light detector 430 in the direction of the arrow 455. In an example, the difference between the length of the side 460 and the length of the side 462 may be proportional to the difference between the distances represented by the arrows 456 and 458. In this manner, the light detector array 404 may be configured to encode light beam pulses received from both the first code wheel 412 and the second code wheel 414, regardless of the fact that their respective resolutions may be different. As examples, resolutions of the light detectors 430-436 in directions of the arrows 439 and 455 may each independently be selected at 36, 75, 150, or 180 lines per inch, corresponding to 1.42, 2.95, 5.91 and 7.09 lines per millimeter.

Figure 6:
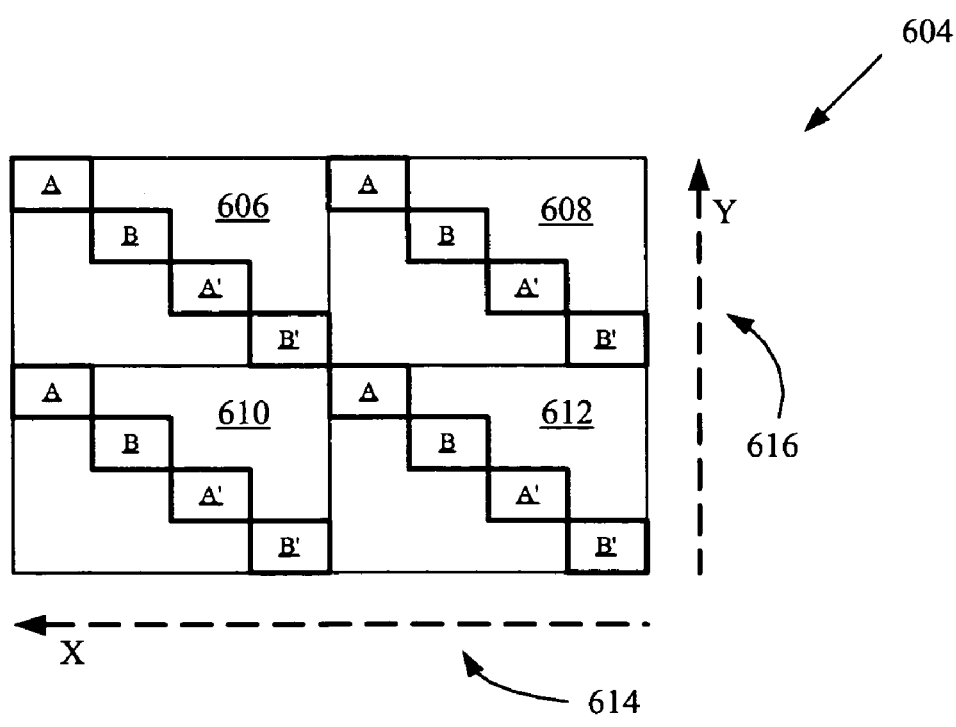
FIG. 6 shows details of a further light detector array.

FIG. 6 shows another example of a light detector array 604 that may replace the light detector array 404. The light detector array 604 may include four sectors 606, 608, 610 and 612 each including light detectors A, A', B and B'. As examples, the integrated channel A and B signals, or the channel A, A', B and B' signals, may be processed to analyze the encoded data as indicative of the two dimensional motion of an external object (not shown) that drives the movement of the code wheels 412 and 414, even though the code wheels 412 and 414 have different resolutions. In a manner analogous to that explained above in connection with FIG. 3, such combinations of multiple signals may yield a more accurate, stable, and/or stronger output signal. In an example, the light detector array 604 may have more than four sectors each including light detectors A, A', B and B'; or each of the sectors may include more than four detectors. As an example, the arrow 614 and the arrow 616 in FIG. 6 may be considered the X- and Y-axes, respectively, of an X-Y grid. As an example, the light detectors A, A', B, and B' shown in FIG. 6 may be arranged in a plurality of bands on at least one diagonal of the X-Y grid.

Figure 7:
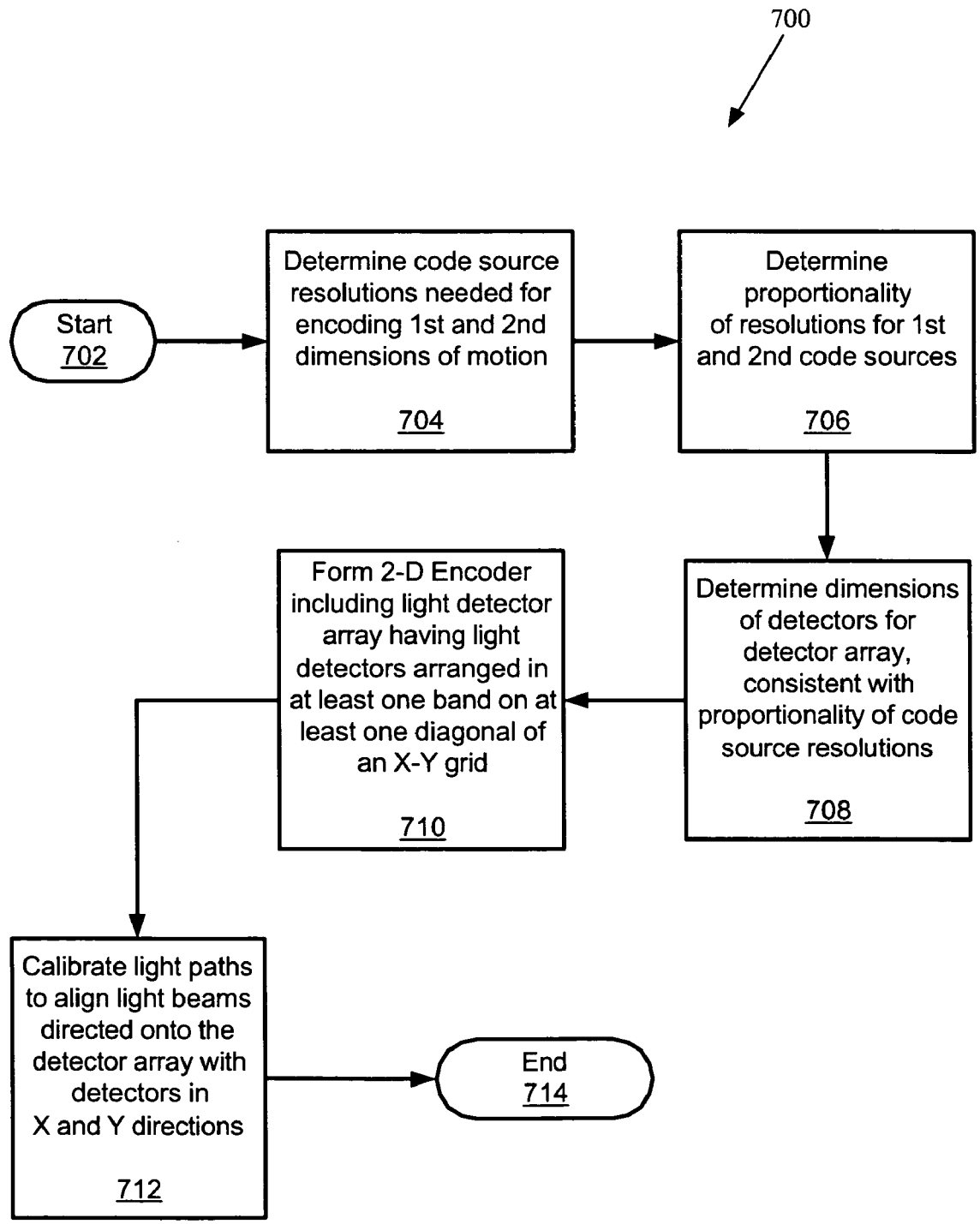
FIG. 7 is a flow chart of a process for forming a two-dimensional optical encoder including a light detector array.

FIG. 7 shows a flow chart of an example of an implementation of a process 700 for forming a 2-D Encoder. The process is summarized and then each step is discussed in further detail. The process starts at step 702. Resolutions for two code sources are determined at step 704, and a proportion between them may be calculated at step 706. Dimensions for light detectors for a light detector array are determined at step 708 consistent with the proportion, and a 2-D Encoder may be formed at step 710 including light detectors arranged in at least one band on at least one diagonal of an X-Y grid so that a beam of light moving in the direction of the Y- and X-axes respectively, may intersect with none, one, two or more of the light detectors at a time. Light paths are calibrated at step 712, and the process ends at step 714.

In further detail regarding step 704, the respective resolutions for two code sources may be determined. As an example, the code sources may be code wheels 412 and 414 shown in FIG. 4. The resolutions may be expressed, as an example, in terms of a number of light beam pulses per revolution of each of the code wheels 412 and 414 to be directed onto the light detector array 404 for encoding. The resolution of the code wheel 412 may also be expressed, as an example, in terms of the width 456 of the light reflective bands 416, 418, 420, 422 and 424. The resolution of the code wheel 414 may also be expressed, as an example, in terms of the width 458 of the light reflective bands 440, 442, 444, 446 and 448. A greater resolution results in more data per code wheel revolution, providing more accuracy. Different resolutions may be selected or needed for the code wheels 412 and 414, respectively. The code wheel 412 may encode a first dimension, and the code wheel 414 may encode a second dimension. The first and second dimensions are approximately orthogonal, as in X- and Y-axes of motion in a plane.

At step 706, the proportionality of the resolutions for the code wheels 412 and 414 may be determined. As an example, the distance represented by the arrow 456 shown in FIG. 4 may be divided by the distance represented by the arrow 458 also shown in FIG. 4, yielding a ratio of 3:1.

In step 708, dimensions for light detectors in the light detector array 404 may be determined consistent with the proportion calculated in step 706. As an example, a dimension of each of the light detectors 430, 434, 432 and 436 parallel with the arrow 439 shown in FIG. 5 may be relatively three times as large as a dimension of each of the light detectors 430-436 parallel with the arrow 455.

At step 710, a 2-D Encoder 400 as shown in FIG. 4 may be formed. The 2-D Encoder 400 may include a light detector array 404 shown in FIG. 5 having light detectors 430, 432, 434 and 436 arranged at least one band on at least one diagonal of an X-Y grid. A beam of light traversing the light detector array 404 from a point along the arrow 455 in a direction parallel with the arrow 439, may intersect with no more than one of the light detectors 430, 434, 432 and 436 at a time; and may or may not at some points along the Y-axis during such a traversal intersect with none of the light detectors. A beam of light traversing the light detector array 404 from a point along the arrow 439 in a direction parallel with the arrow 455 may likewise intersect with no more than one of the light detectors 430, 434, 432 and 436 at a time; and may or may not at some points along the X-axis during such a traversal intersect with none of the light detectors. As an example, localized areas may exist along the X- and Y-axes of the light detector array 404 where such a beam of light moving in the direction of the Y- and X-axes respectively, may intersect with two or more of the light detectors 430-436 at a time.

In another example of the process 700, the light detector array 604 shown in FIG. 6 may be formed. As an example, the arrow 614 and the arrow 616 in FIG. 6 may be considered the X- and Y-axes, respectively, of an X-Y grid. As an example, the light detectors A, A', B, and B' shown in FIG. 6 may be arranged in a plurality of bands on at least one diagonal of the X-Y grid.

In an example, the light detector array 404 may be formed as part of an integrated process for fabricating the 2-D Encoder 400. As an example, an emitter 102, a light detector array 104, control circuitry 106, a lens 108 positioned over the emitter 102, and a lens 110 positioned over the light detector array 104 may be formed together on a suitable substrate.

At step 712, light paths for the 2-D Encoder 400 may be calibrated to align light beam pulses directed onto the light detector array 404 including the light detectors 430, 432, 434 and 436 in the X- and Y-directions. As an example, light beam pulses may be reflected onto the light detector array 404 as discussed above in connection with FIG. 4. In an example, this alignment may be carried out so that a light beam pulse reflected from light reflective band 420 may be successively aligned with light detectors 436, 432, 434 and 430 as the portion of the code wheel 412 moves in the direction of the arrow 438. In another example, this alignment may be carried out so that a light beam pulse reflected from light reflective band 444 may be successively aligned with light detectors 430, 434, 432 and 436 as the portion of the code wheel 414 moves in the direction of the arrow 454. The process then ends at step 714. It is understood by those skilled in the art that variations on the order of steps shown in FIG. 7 and discussed above are contemplated and within the scope and teachings of this disclosure.

Figure 8:
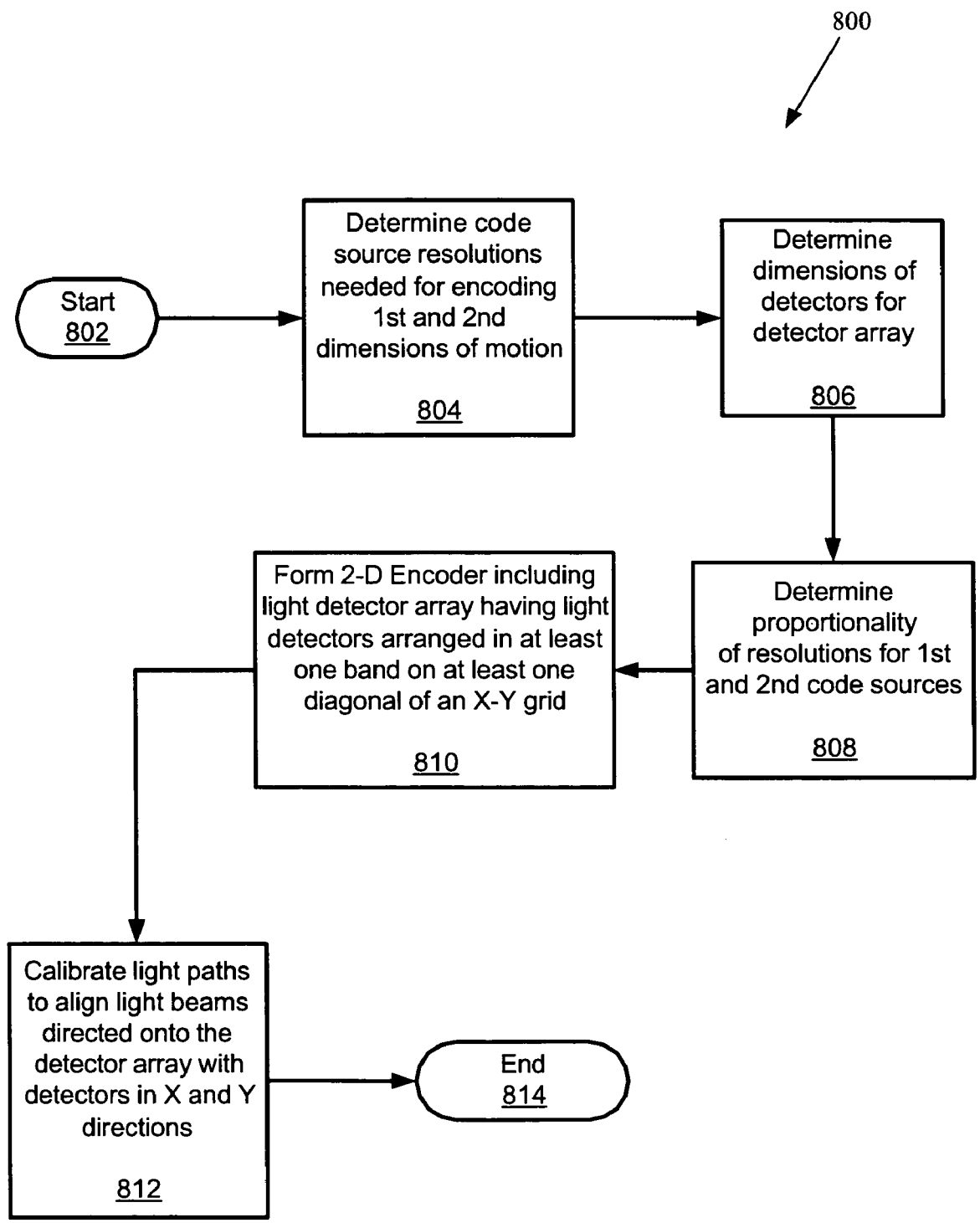
FIG. 8 is a flow chart of another process for forming a two-dimensional optical encoder including a light detector array.

FIG. 8 shows a flow chart of an example of another implementation of a modified process 800 for forming a 2-D Encoder. The process starts at step 802. Resolutions for two code sources are determined at step 804. Dimensions for light detectors for a light detector array are determined at step 806. At step 808, a proportion between the resolutions of the two code sources is calculated. A 2-D Encoder may then be formed at step 810 including light detectors arranged in at least one band on at least one diagonal of an X-Y grid. Light paths are calibrated at step 812, taking into account the code source resolutions, the proportionality between them, and the dimensions of the detectors for the detector array, and the process ends at step 814.

Step 804 may be carried out in the same manner as discussed above in connection with step 704. In step 806, dimensions for light detectors in the light detector array 404 may be determined. At step 808, the proportionality of the resolutions for the code wheels 412 and 414 may be determined. As an example, a dimension of each of the light detectors 430, 434, 432 and 436 parallel with the arrow 439 shown in FIG. 5 may be relatively three times as large as a dimension of each of the light detectors 430-436 parallel with the arrow 455. The distance represented by the arrow 456 shown in FIG. 4 may thus be divided by the distance represented by the arrow 458 also shown in FIG. 4, yielding a ratio of 3:1. Step 810 may then be carried out in the same manner as discussed above in connection with step 710.

At step 812, light paths for the 2-D Encoder 400 may be calibrated to align light beam pulses directed onto the light detector array 404 including the light detectors 430, 432, 434 and 436 in the X- and Y-directions, taking into account the code source resolutions determined at step 804, the dimensions of the detectors for the detector array determined at step 806, and the proportionality between the code source resolutions determined at step 808. The process then ends at step 814.

Figure 9:
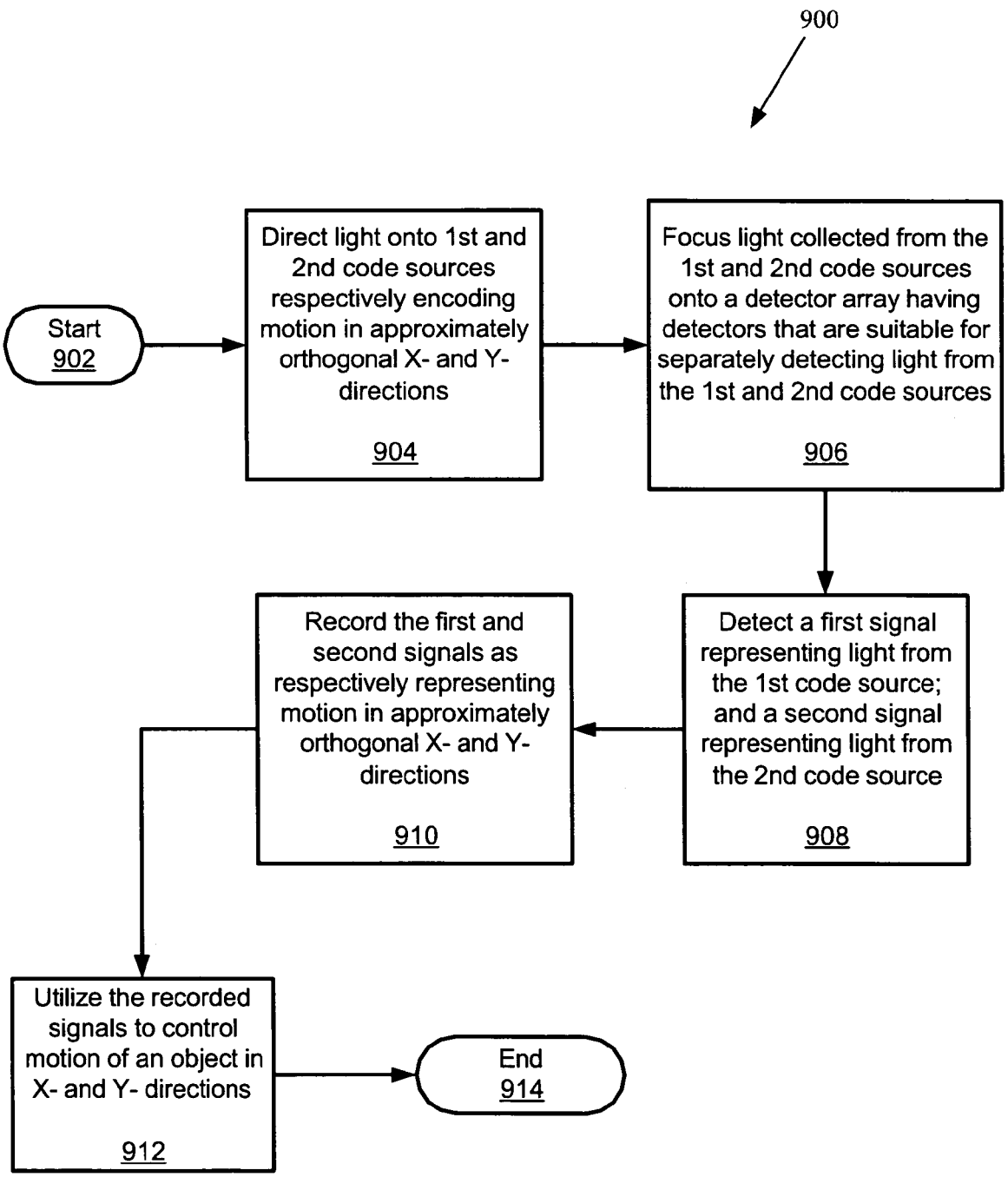
FIG. 9 is a flow chart of a process for encoding two-dimensional motion.

FIG. 9 shows a flow chart of an example of yet another implementation of a process 900 for encoding 2-dimensional motion. The process begins at step 902. At step 904, light may be directed onto $1^{st}$ and $2^{nd}$ code sources respectively encoding motion in approximately orthogonal X- and Y-directions. Light may then be collected at step 906 from the $1^{st}$ and $2^{nd}$ code sources. The light may be directed onto a detector array having detectors that are suitable for separately detecting light from the $1^{st}$ and $2^{nd}$ code sources. As an example, a light detector array as shown in FIG. 2, 3, 5 or 6 may be utilized. At step 908, a first signal may be detected representing light collected from the $1^{st}$ code source; and a second signal may be detected representing light collected from the $2^{nd}$ code source. The first and second signals may be recorded at step 910 as respectively representing motion in approximately orthogonal X- and Y-directions. At step 912, the recorded signals may be utilized to control a motion of an external object (not shown) in X- and Y-directions. The process ends at step 914.

Moreover, it will be understood that the foregoing description of numerous implementations has been presented for purposes of illustration and description. This description is not exhaustive and does not limit the claimed inventions to the precise forms disclosed. Modifications and variations are possible in light of the above description or may be acquired from practicing the invention. As an example, multiple light detectors, one or more of which encoding two dimensional motion, may be utilized together or may be formed as an integral device. The claims and their equivalents define the scope of the invention.

What is claimed:

1. A Two-Dimensional Optical encoder ("2-D Encoder") comprising:
    a first code source;
    a second code source, wherein said first code source and said second code source comprise code wheels;
    a light emitter positioned to illuminate said first and second code sources; and
    a light detector array positioned to receive light from said light emitter as reflected by said first and second code sources, wherein the light detector array includes at least one band of light detectors arranged on at least one diagonal of an X-Y grid having an X-axis and a Y-axis, wherein the X-axis and Y-axis are approximately orthogonal, and wherein the 2-D Encoder includes only one light detector array.

2. The 2-D Encoder of claim 1, further including
    a first lens positioned over the light emitter, and
    a second lens positioned over the light detector array.

3. The 2-D Encoder of claim 1, further including control circuitry for the light detector array.

4. The 2-D Encoder of claim 1, wherein the light detector array includes a plurality of bands of light detectors arranged on a plurality of diagonals.

5. The 2-D Encoder of claim 1, wherein a ratio of dimensions of the light detectors along said X-axis and said Y-axis is proportional to a ratio of widths of light reflective bands within said first and second code sources.

6. The 2-D Encoder of claim 1, wherein the plurality of light detectors have uniform dimensions.

7. A process of making a Two-Dimensional Optical encoder ("2-D Encoder") comprising:
    forming a light emitter;
    forming a light detector array, wherein the light detector array includes at least one band of light detectors arranged on at least one diagonal in an X-Y grid having an X-axis and a Y-axis, wherein the X-axis and the Y-axis are approximately orthogonal;
    forming a first code source;
    forming a second code source; and
    positioning said first code source and said second code source adjacent said light emitter and said light detector array such that light from said light emitter reaches said first code source and said second code source and thereafter said light detector array, wherein said 2-D Encoder includes only one light detector array wherein said first code source and said second code source comprise code wheels.

8. The process of claim 7, further including arranging light detectors in a plurality of bands of light detectors arranged on a plurality of diagonals.

9. The process of claim 7, further including determining dimensions of the light detectors such that a ratio of dimensions of the light detectors along said X-axis and said Y-axis is proportional to a ratio of widths of light reflective bands within said first and second code sources.

10. A method for encoding two-dimensional motion, the method comprising:
    directing light onto first and second code sources respectively encoding motion in approximately orthogonal X- and Y-directions;
    focusing light collected from the first and second code sources onto a detector array having detectors suitable for separately detecting light from the first and second code sources;
    detecting a first signal representing light from the first code source;
    detecting a second signal representing light from the second code source, wherein said first and second signals are detected utilizing said detector array, wherein said detectors of said detector array comprise at least one band of light detectors arranged on at least one diagonal of an X-Y grid having an X-axis and a Y-axis, wherein the X-axis and Y-axis are approximately orthogonal, the method utilizing only one detector array wherein said first code source and said second code source comprise code wheels.

11. The method of claim 10, further including recording the first and second signals as respectively representing motion in approximately orthogonal X- and Y-directions.

12. The method of claim 10, wherein the light detector array includes a plurality of bands of light detectors arranged on a plurality of diagonals.

13. The method of claim 10, wherein a ratio of dimensions of the light detectors along said X-axis and said Y-axis is proportional to a ratio of widths of light reflective bands within said first and second code sources.

14. The method of claim 10, wherein the light detectors have uniform dimensions.

* * * * *